(12) United States Patent
Salter et al.

(10) Patent No.: US 9,347,634 B2
(45) Date of Patent: May 24, 2016

(54) ILLUMINATING FLOOR MAT WITH WIRELESS POWER TRANSFER

(71) Applicant: Ford Global Technologies, LLC, Dearborn, MI (US)

(72) Inventors: Stuart C. Salter, White Lake, MI (US); Ali Ammar, Dearborn, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 448 days.

(21) Appl. No.: 13/775,579

(22) Filed: Feb. 25, 2013

(65) Prior Publication Data

US 2014/0239710 A1 Aug. 28, 2014

(51) Int. Cl.
*H02J 17/00* (2006.01)
*F21S 8/10* (2006.01)
*B60Q 3/02* (2006.01)
*B60N 3/04* (2006.01)

(52) U.S. Cl.
CPC .............. *F21S 48/00* (2013.01); *B60Q 3/0283* (2013.01); *B60Q 3/0293* (2013.01); *H02J 17/00* (2013.01)

(58) Field of Classification Search
CPC .......... B60N 3/04; B60N 3/048; B60Q 3/007; B60Q 3/0293; B60Q 3/0283; H02J 13/0034; H02J 13/0037; H02J 13/0041
USPC ........................................................ 307/104
See application file for complete search history.

(56) References Cited

U.S. PATENT DOCUMENTS

| | | | | |
|---|---|---|---|---|
| 5,254,384 A * | 10/1993 | Gordon | ........................... | 428/71 |
| 5,511,283 A * | 4/1996 | Hirose | ................... | 16/8 |
| 6,417,778 B2 * | 7/2002 | Blum et al. | ................ | 340/815.4 |
| 6,481,877 B1 * | 11/2002 | Bello, Jr. | ....................... | 362/488 |
| 6,736,442 B2 * | 5/2004 | Gebreselassie et al. | ... | 296/97.23 |
| 6,821,126 B2 * | 11/2004 | Neidlein | ........... | H01R 13/7037 439/38 |
| 7,436,325 B2 * | 10/2008 | Bailey | ............................. | 341/20 |
| 7,670,022 B2 | 3/2010 | Kessler et al. | | |
| 7,857,484 B2 * | 12/2010 | Marshall et al. | ......... | 362/249.14 |
| 2010/0039066 A1 * | 2/2010 | Yuan et al. | .................... | 320/108 |
| 2010/0201201 A1 * | 8/2010 | Mobarhan | ............... | H02J 5/005 307/104 |
| 2011/0227527 A1 * | 9/2011 | Zhu et al. | ...................... | 320/108 |
| 2012/0248891 A1 * | 10/2012 | Drennen | ................. | H02J 5/005 307/104 |
| 2013/0038280 A1 * | 2/2013 | Boundy et al. | ................ | 320/108 |
| 2013/0106346 A1 * | 5/2013 | Salter et al. | .................... | 320/108 |

(Continued)

FOREIGN PATENT DOCUMENTS

| | | | | |
|---|---|---|---|---|
| DE | 10322407 A1 * | 12/2004 | ............... | B60N 3/04 |
| DE | 20320743 U1 * | 3/2005 | ............... | B60N 3/04 |

(Continued)

OTHER PUBLICATIONS

Kroos, Heinz, DE 102007060381 A1, Jun. 2009 (Specification Machine Translation).*
Originally Filed German Patent, DE20320743U1.*
Translation of DE20320743U1.*

*Primary Examiner* — Jared Fureman
*Assistant Examiner* — Michael Warmflash
(74) *Attorney, Agent, or Firm* — Vichit Chea; Price Heneveld LLP

(57) ABSTRACT

An illuminable mat adapted for use in a variety of settings is provided. The illuminable mat includes an illuminable region and a light source that illuminates the illuminable region. The light source is powered by a receiver that is wirelessly supplied by a transmitter.

20 Claims, 5 Drawing Sheets

(56) References Cited

U.S. PATENT DOCUMENTS

2013/0313854 A1* 11/2013 Johnson ............... B60N 3/046 296/97.23
2014/0217965 A1* 8/2014 Van Wiemeersch et al. . 320/108
2015/0048752 A1* 2/2015 Van Den Brink et al. .... 315/246

FOREIGN PATENT DOCUMENTS

DE 102007060381 A1 * 6/2009 ............. B60N 3/044
DE 102010014948 A1 * 10/2011 ........... B60Q 1/2615

* cited by examiner

ILLUMINATING FLOOR MAT WITH WIRELESS POWER TRANSFER

FIELD OF THE INVENTION

The present invention generally relates to an illuminable mat and more specifically to an illuminable mat that is capable of being wirelessly powered.

BACKGROUND OF THE INVENTION

Known mats that are capable of being illuminated typically employ wire connections, which may have drawbacks in certain settings. For example, in a vehicular setting, occupants often place their feet on the floor mats, which may cause the mats to be disconnected from the power source, thereby preventing the occupants from enjoying the visual benefits conferred by such mats. As such, a need arises for a mat that can be illuminated without the drawbacks associated with wire connections.

SUMMARY OF THE INVENTION

According to one aspect of the present invention, an illuminable mat is provided that includes an illuminable region. A light source is provided to illuminate the illuminable region and a receiver is configured to wirelessly receive power that is supplied to the light source.

According to another aspect of the present invention, an illumination system is provided for a mat placed on an interior surface of a vehicle. The system includes an illuminable region of the mat and a light source to illuminate the illuminable region. The system also includes a receiver that supplies power to the light source and a transmitter that wirelessly powers the receiver.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B; alone; C alone; A and B in combination; A and C in combination; B and C in combination; or A, B, and C in combination.

To promote an understanding of the present invention, the embodiments described herein are referenced in a vehicular setting for purposes of illustration. However, it is to be understood that the present invention is adaptable to a variety of settings and as such, is not limited for use in vehicles only.

Figure 1:
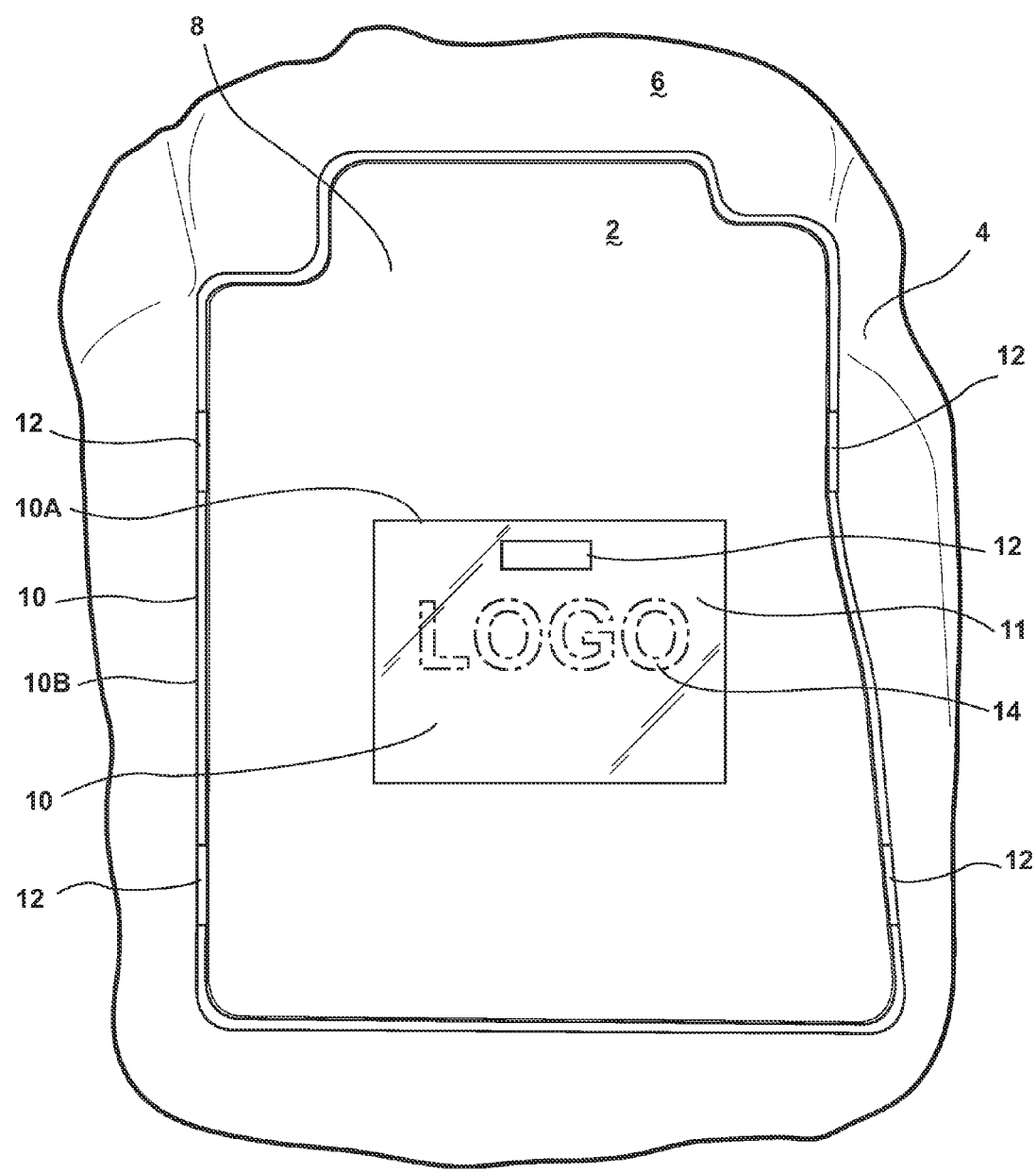
FIG. 1 is a top view of an illuminable mat according to one embodiment of the present invention.

Referring now to FIG. 1, an illuminated mat 2 is generally shown on a load-bearing floor surface 4 in a footwell space 6 of a vehicle. The mat 2 is typically flexible and may be manufactured from any conventional material such as rubber and fibrous textile. The mat 2 may also take on a variety of shapes and sizes to conform to the footwell space 6 and any nearby structures. The mat 2 includes a first portion 8 that is viewable when the mat 2 is positioned on the floor surface 4 and at least one illuminable region 10 that is integrated with the first portion 8. According to the present embodiment, the illuminable region 10 defines an enclosed space 11 and may be disposed in a variety of areas on the first portion 8 such as a substantially central area 10A and/or a peripheral area 10B of the mat 2. To illuminate the illuminable region 10, at least one light source 12 is provided within the illuminable region 10. The light source(s) may include conventional lighting such as LEDs and light pipes. Additionally, a decorative image 14 may be provided in the illuminable region 10 and illuminated to display a logo, a symbol, or other desired images.

Since the mat 2 may come into contact with foreign objects, it is preferable to construct the illuminable region 10 from a durable and fluid resistant material also having transparent and/or translucent qualities. For example, one suitable material includes a flexible acrylic sheet that not only protects the light source 12 from outside forces and fluid spills, but also enables the illuminable region 10 to flex accordingly when the mat 2 is being lifted from or placed onto the floor surface 4.

Figure 2:
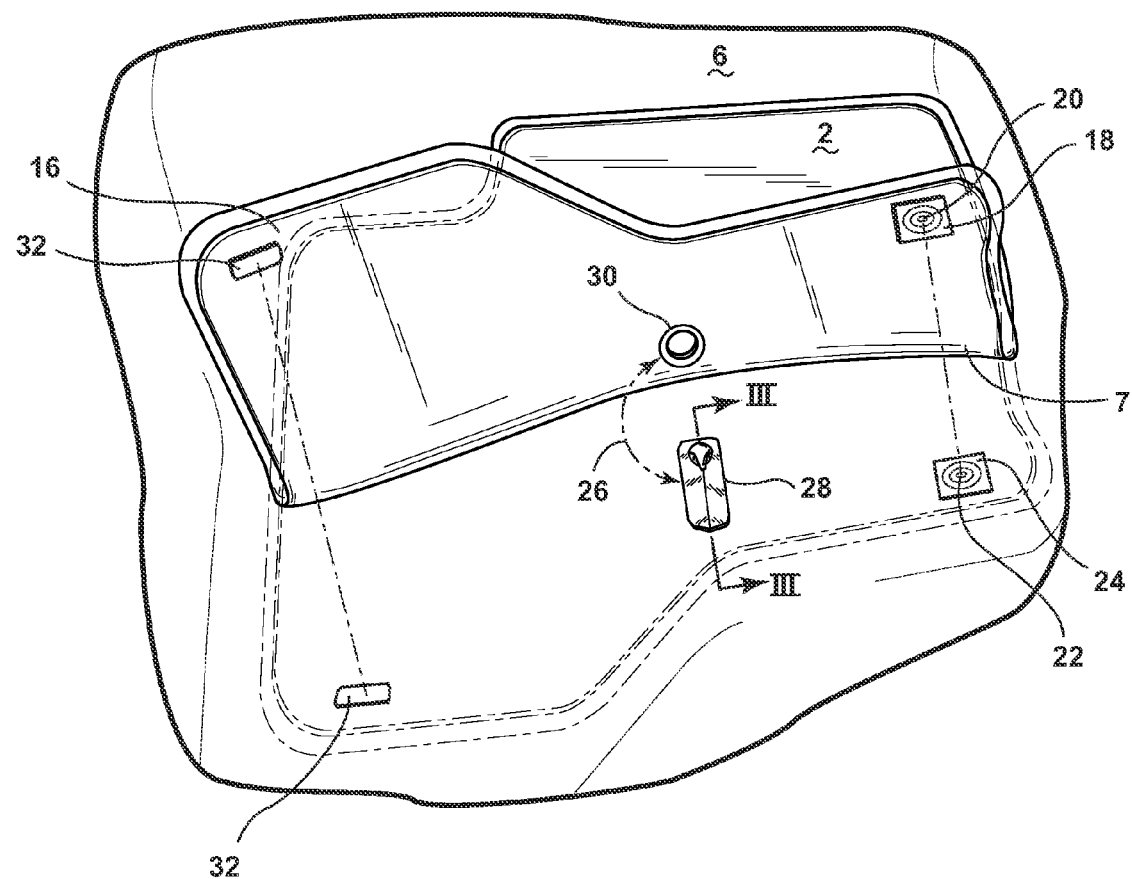
FIG. 2 is a perspective view of the illuminable mat shown partially lifted away from the vehicle floor.

The mat 2 is shown in FIG. 2, in a partially lifted position pulled upward on the front edge and away from the floor surface 4. The mat 2 includes a second portion 16 that is coupled to a first housing 18. The first housing 18 includes a receiving coil 20, or other suitable receiver that is configured to wirelessly receive power. A second housing 24 is coupled to the floor surface 4 and includes a transmitting coil 24, or other suitable transmitter that is configured to wirelessly transfer power. In the present embodiment, the first and second housing 18, 24 may be any conventional housing, such as plastic, and the receiving and transmitting coils 20, 22 may be any of the known coils conventionally employed in wireless power transfer applications.

For wireless power transfer to occur, the mat 2 must be properly positioned over the floor surface 4 such that the receiving coil 20 and the transmitting coil 22 are positionally aligned with each other. Once a proper alignment is detected, the transmitting coil 22 can wirelessly transfer power to the receiving coil 20, which may in turn supply power to the light sources 12 to illuminate the illuminable region 10 and/or decorative image 14.

The first and second housings 18, 24 may be coupled to the mat 2 and floor surface 4 in a variety of positions and configurations. For example, the first housing 18 may be provided on the first portion 8 of the mat 2, on the second portion 16 of the mat 2, and/or in the space therebetween and the second housing 24 may be provided above the floor surface 4, below the surface 4, and/or in the space therebetween. However, since inductive powering generates an electromagnetic field (hereafter referred to as "EMF"), proper consideration should be given to the positioning of the first and second housings 18, 24 in the event a living being comes into contact with the mat 2 while the receiving coil 20 is being powered. With respect to the footwell space 6 of the vehicle, it is most logical to position the first and second housings 18, 24 away from the central area of the mat 2, where passengers most commonly place their feet.

To prevent the mat 2 from moving and possibly causing the receiving and transmitting coils 20, 22 to misalign, a holding assembly 26 removably couples the mat 2 to the floor surface 4 in the proper power transfer position. The holding assembly 26 is shown in FIG. 2 in two exemplary configurations. In the first configuration, the floor surface 4 includes a clip 28 and the mat 2 includes a complimentary thru-hole 30 that is positionally aligned with the clip 28 such that inserting the clip 28 through the thru-hole retains the mat 2 in the proper power transfer position. In the second configuration, the floor surface 4 and the mat 2 both include a ferromagnetic member 32, wherein each ferromagnetic member 32 is positionally aligned and attracted to the other ferromagnetic member 32 to retain the mat 2 in the proper power transfer position. While both holding assembly 26 configurations are shown in FIG. 2, it is also conceivable to employ only one of the holding assembly 26 configurations and it is further conceivable to employ more than one of each holding assembly 26 configuration to provide the mat 2 with additional positioning and resistance to movement.

Referring to FIGS. 3-6, four embodiments of the mat 2 and the wireless power arrangement are generally shown. In each of these embodiments, the second housing 24 is integrated with the clip 28 to positively locate the first housing 18 when the clip 28 is in the proper retaining position with respect to the thru-hole 30. As previously noted, wireless power transfer occurs when the transmitting coil 22 is properly aligned with the receiving coil 20. Since there may be instances where the mat 2 is not present or improperly oriented, it is preferable to verify a proper alignment between the receiving and transmitting coils 20, 22 before initiating a powering session. To verify if this condition is met, a controller 34 such as a radiofrequency identification chip (RFID) may be employed to detect the presence of the second housing 24 and/or receiving coil 20. If detected, the controller 34 may signal a power source 36, such as the vehicle power source, to provide electrical power to the transmitting coil 22 to wirelessly power the receiving coil 20. In turn, the receiving coil 20 may directly or indirectly supply electrical power to the light source(s) 12. In at least one embodiment, the receiving coil 20 may be electrically coupled to a light controller 38 that controls the output of the light source(s) 12. In this embodiment, the light source(s) 12 may be configured to output a variety of effects and/or colors. In at least one embodiment, the receiving coil 20 may be electrically coupled to a battery system (not shown), wherein the battery system can be charged by the receiving coil 20 to provide power to the light source(s) 12 and configured to communicate with the controller 34. In this embodiment, the battery system can determine when wireless power transfer occurs based on the charge state of the battery. The electrical connections between the receiving coil 20, light controller 38, the light source 12, and/or battery system may be any conventional type such as wired circuits, flexible circuits, and/or conductive ink. Since liquids may come into contact with the mat 2, a conventional sealant may also be employed to provide fluid resistivity to the chosen connection type.

As previously noted, it may be desirable to minimize the effects of EMF that may be generated with the use of wireless power transfer. In the case of a vehicle, it is highly likely that an occupant will rest their feet on the mat 2 for extended periods of time. Thus, in addition to positioning the receiving and transmitting coils 20, 22 away from the more commonly used areas of the mat 2, it is also preferable to provide a shielding member 40 when employing the present embodiment in a vehicular setting to protect occupants as well as other vehicle structures and systems from EMF. Also, the mat 2 may be configured to operate at lower voltages as a further preventative measure to minimize the effects of EMF.

Various shielding approaches may be employed. For example, one cost effective shielding approach involves using a metal shield that is grounded. Alternatively, a capacitive sensing system (not shown) may additionally be provided or substituted for the metal shield and functions to inhibit wireless power transfer when the capacitive sensing system senses the presence of an occupant. A suitable capacitive sensing system is described in U.S. patent application Ser. No. 13/282,933 entitled "WIRELESS CHARGING SYSTEM HAVING SENSE SHUTDOWN AND METHOD THEREFOR" and filed on Oct. 27, 2011, by Stuart C. Salter et al., the entire disclosure of which is incorporated herein by reference.

Figure 3:
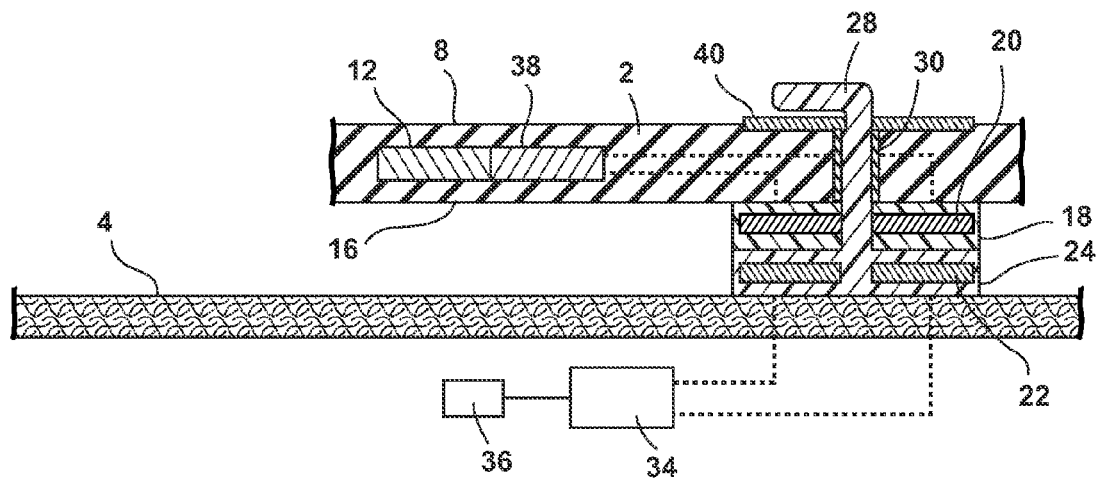
FIG. 3 is a cross-sectional side view of one embodiment of the illuminable mat taken through line III-III of FIG. 2, wherein a transmitting coil is provided inside a clip in a first configuration and is aligned with a receiving coil in a tightly coupled arrangement.
Figure 4:
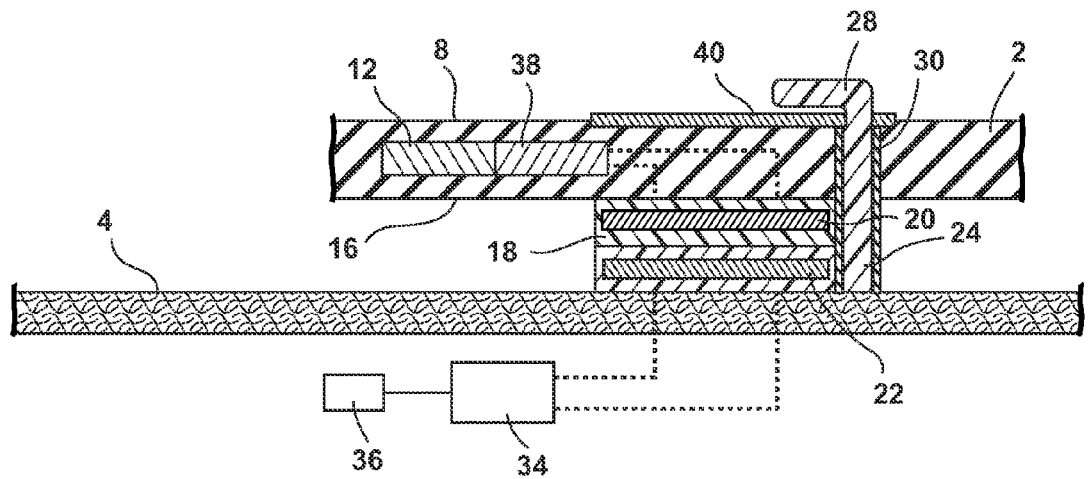
FIG. 4 is a cross-sectional side view of another embodiment of the illuminable mat taken through line III-III of FIG. 2, wherein the transmitting coil is provided inside the clip in a second configuration and is aligned with the receiving coil in a tightly coupled arrangement.
Figure 5:
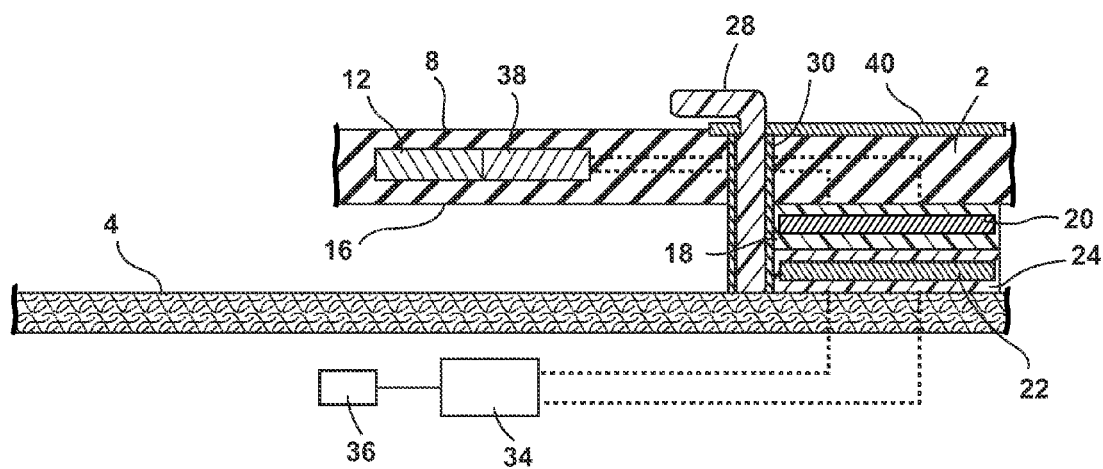
FIG. 5 is a cross-sectional side view of another embodiment of the illuminable mat taken through line III-III of FIG. 2, wherein the transmitting coil is provided inside the clip in a third configuration and is aligned with the receiving coil in a tightly coupled arrangement.
Figure 6:
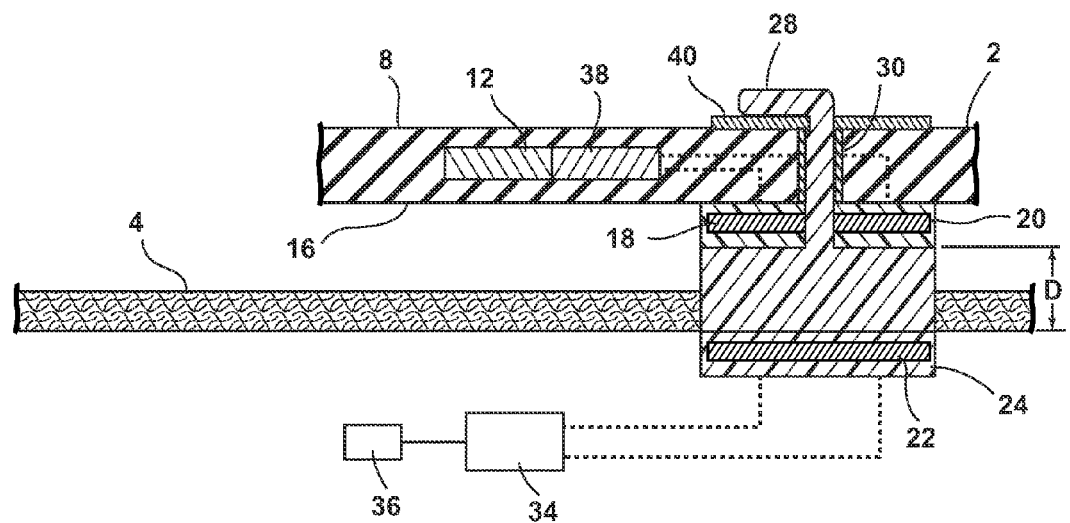
FIG. 6 is a cross-sectional side view of another embodiment of the illuminable mat taken through line III-III of FIG. 2, wherein the transmitting coil is provided inside the clip in a fourth configuration and is aligned with the receiving coil in a loosely coupled arrangement.

With respect to the present embodiments, two inductive coupling systems are contemplated. As shown in FIGS. 3-5, the receiving and transmitting coils 20, 22 are provided in a tightly coupled inductive system, wherein the first housing 18 is substantially contacting the second housing 24. Alternatively, as shown in FIG. 6, the receiving and transmitting coils 20, 22 may also be provided in a loosely coupled inductive system, wherein the first housing 18 is spaced from the second housing 24 at an operating distance D. Generally, a tightly coupled inductive system will provide greater power transfer capability than a loosely coupled inductive system. However, certain measures may be taken to optimize power transfer in loosely coupled systems such as selecting operating distances D that do not sacrifice locational accuracy. In practice, loosely coupled systems adapted for power transfer have been shown to be functional at operating distances D of up to 40 mm, which should readily accommodate conventional mats currently in use. Still, a greater operating distance D is achievable by conventionally providing a loosely coupled system with capacitive compensation.

Figure 7:
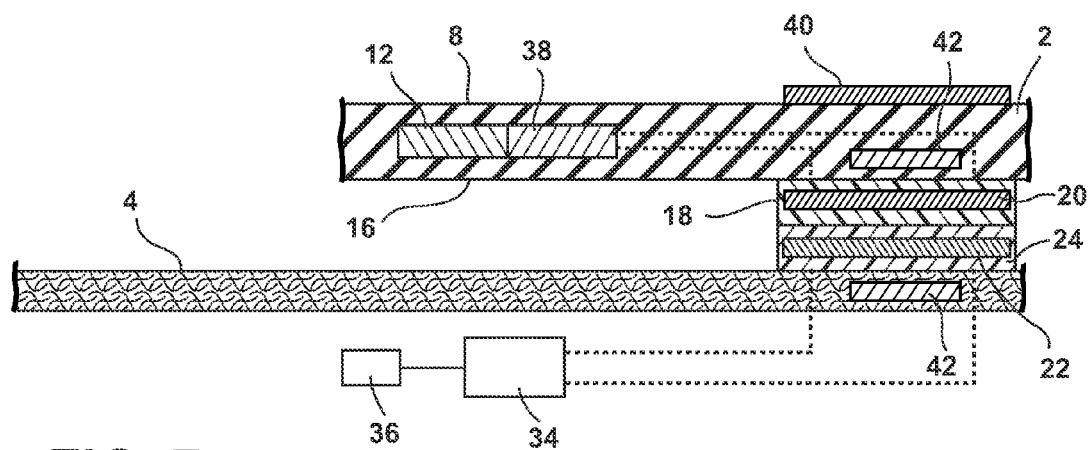
FIG. 7 is a cross-sectional side view of another embodiment of the illuminable mat taken through line III-III of FIG. 2, wherein alignment members are used to align the receiving coil with the transmitting coil in a tightly coupled arrangement.
Figure 8:
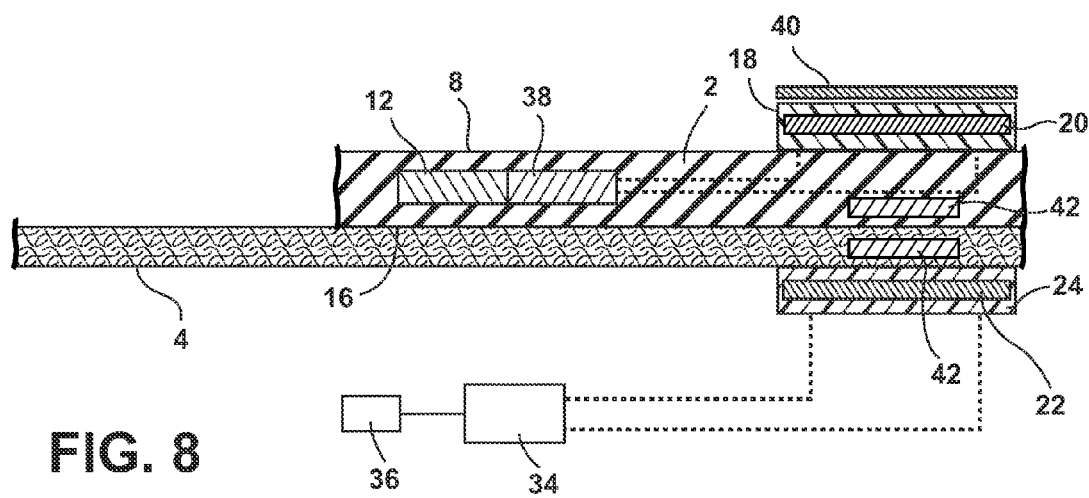
FIG. 8 is a cross-sectional side view of another embodiment of the illuminable mat taken through line III-III of FIG. 2, wherein alignment members are used to align the receiving coil with the transmitting coil in a loosely coupled arrangement.

Referring to FIGS. 7 and 8, two additional embodiments of the present invention are shown, wherein the receiving and transmitting coils 20, 22 are each optimized for use with an alignment magnet 42, which may include the ferromagnetic members 32 described previously. In this configuration, the alignment magnets 42 positively align the first housing 18 to the second housing 24 so that wireless power transfer may occur in the manner described in the previous embodiments. Similarly, just like the previous embodiments, the receiving and transmitting coils 20, 22 may be configured as a tightly coupled system as shown in FIG. 7, or a loosely coupled system as shown in FIG. 8.

From the embodiments described and shown in FIGS. 3-8, it can be appreciated that locational accuracy between the receiving and transmitting coil 20, 22 is increased when employing a guided positioning system such as that provided by the clip 28 and thru-hole 20 or the alignment magnets 42. However, it should also be appreciated that wireless power transfer between the receiving and transmitting coils 20, 22 can be realized without the use of such systems, which may come at the expense of locational accuracy. Moreover, it should be appreciated that numerous variations of a tightly coupled and loosely coupled inductive system are achievable using the principles and teachings of the previous embodiments and it is further conceivable to use other wireless power transfer systems, such as capacitive coupling systems, to illuminate the mat 2 by adopting the principles and teachings provided herein. As such, the embodiments provided here are for exemplary purposes and should not be seen as limiting.

Accordingly an illuminating mat 2 has been advantageously described herein. The mat 2 benefits from wireless power transfer and may be adapted for use in a variety of settings to provide ambient lighting without compromising its utilitarian purpose.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination system comprising:
   a mat comprising:
      an illuminable region;
      a light source for illuminating the region;
      a thru-hole; and
      a receiver disposed proximate the thru-hole; and
   a clip housing a transmitter and fixedly secured to a support surface;
   wherein the clip is hooked through the thru-hole to retain the mat on the support surface such that a wireless power transfer occurs between the transmitter and the receiver in order to power the light source.

2. The illumination system of claim 1, wherein the receiver comprises a receiving coil and the transmitter comprises a transmitting coil.

3. The illumination system of claim 1, wherein the receiver is disposed in a housing disposed on an underside of the mat.

4. The illumination system of claim 3, wherein the housing is positioned directly below the thru-hole.

5. The illumination system of claim 3, wherein the housing is positioned off to a side of the thru-hole.

6. The illumination system of claim 3, wherein when the clip is engaged with the thru-hole, the housing rests atop a lower portion of the clip in which the transmitter is located.

7. The illumination system of claim 3, wherein a lower portion of the clip extends through the support surface such that the transmitter is positioned below the support surface.

8. The illumination system of claim 3, wherein the clip is received through the housing in which the receiver is located prior to engaging the thru-hole of the mat.

9. The illumination system of claim 1, further comprising an RFID for detecting the presence of the receiver to verify whether the receiver and the transmitter are properly aligned prior to the initiation of wireless power transfer therebetween.

10. The illumination system of claim 1, further comprising a first alignment magnet that is part of the mat and is attracted to a second alignment magnet that is part of the support surface.

11. An illumination system comprising:
    a mat comprising:
       an illuminable region;
       a light source for illuminating the region;
       a thru-hole; and
       a receiver disposed in a housing directly below the thru-hole and concentrically aligned with the thru-hole; and
    a clip housing a transmitter and fixedly secured to a support surface;
    wherein the clip is hooked through the thru-hole to retain the mat on the support surface such that a wireless power transfer occurs between the transmitter and the receiver in order to power the light source.

12. The illumination system of claim 11, wherein the receiver comprises a receiving coil and the transmitter comprises a transmitting coil.

13. The illumination system of claim 11, wherein when the clip is engaged with the thru-hole, the housing rests atop a lower portion of the clip in which the transmitter is located.

14. The illumination system of claim 11, wherein a lower portion of the clip extends through the support surface such that the transmitter is positioned below the support surface.

15. The illumination system of claim 11, wherein the clip is received through the housing in which the receiver is located prior to engaging the thru-hole of the mat.

16. The illumination system of claim 11, further comprising a first alignment magnet that is part of the mat and is attracted to a second alignment magnet that is part of the support surface.

17. An illumination system comprising:
    a mat comprising:
       an illuminable region;
       a light source for illuminating the region;
       a thru-hole; and
       a receiver disposed in a housing positioned off to a side of the thru-hole; and
    a clip housing a transmitter and fixedly secured to a support surface;
    wherein the clip is hooked through the thru-hole to retain the mat on the support surface such that a wireless power transfer occurs between the transmitter and the receiver in order to power the light source.

18. The illumination system of claim 17, wherein the receiver comprises a receiving coil and the transmitter comprises a transmitting coil.

19. The illumination system of claim 17, wherein when the clip is engaged with the thru-hole, the housing rests atop a lower portion of the clip in which the transmitter is located.

20. The illumination system of claim 17, further comprising a first alignment magnet that is part of the mat and is attracted to a second alignment magnet that is part of the support surface.

* * * * *